US012607360B2

(12) United States Patent
Cadima

(10) Patent No.: US 12,607,360 B2
(45) Date of Patent: Apr. 21, 2026

(54) FLAME RECTIFICATION CIRCUIT SYSTEM FOR A GAS COOKTOP

(71) Applicant: Haier US Appliance Solutions, Inc., Wilmington, DE (US)

(72) Inventor: Paul Bryan Cadima, Crestwood, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 416 days.

(21) Appl. No.: 18/469,024

(22) Filed: Sep. 18, 2023

(65) Prior Publication Data

US 2025/0093040 A1 Mar. 20, 2025

(51) Int. Cl.
| | |
|---|---|
| *F24C 3/12* | (2006.01) |
| *F23N 1/00* | (2006.01) |
| *F23Q 3/00* | (2006.01) |
| *G05D 23/19* | (2006.01) |

(52) U.S. Cl.
CPC .............. *F24C 3/126* (2013.01); *F23N 1/005* (2013.01); *F23Q 3/008* (2013.01); *G05D 23/19* (2013.01); *F23N 2229/12* (2020.01)

(58) Field of Classification Search
CPC .......... F23Q 3/008; F24C 3/126; F24C 3/103; G05D 23/19; F23N 1/005; F23N 5/123; F23N 2229/12
See application file for complete search history.

(56) References Cited

U.S. PATENT DOCUMENTS

| | | | |
|---|---|---|---|
| 3,947,220 A | 3/1976 | Dietz | |
| 9,476,595 B2 | 10/2016 | Cadima | |
| 10,215,405 B2 | 2/2019 | Kim et al. | |
| 11,262,070 B2 * | 3/2022 | Billman | F23N 1/005 |
| 2004/0261779 A1 * | 12/2004 | Pickering | F24C 1/04 |
| | | | 126/39 J |
| 2015/0037737 A1 * | 2/2015 | Pottenger | F24C 3/126 |
| | | | 431/74 |
| 2020/0256563 A1 * | 8/2020 | Cadima | F23D 14/06 |
| 2021/0102700 A1 * | 4/2021 | Billman | F24C 3/126 |
| 2022/0178547 A1 * | 6/2022 | Cowan | F24C 3/087 |

FOREIGN PATENT DOCUMENTS

| | | |
|---|---|---|
| JP | 3204498 B2 | 9/2001 |
| JP | 6389647 B2 | 9/2018 |
| KR | 100603989 B1 | 7/2006 |

* cited by examiner

*Primary Examiner* — Alfred Basichas
(74) *Attorney, Agent, or Firm* — Dority & Manning, P.A.

(57) ABSTRACT
A cooktop defining comprises an open loop gas burner, a closed loop gas burner, a flame rectification circuit for detecting a flame at the closed loop gas burner, a spark module comprising a plurality of spark electrodes, at least one of the plurality of spark electrodes being operably coupled to each of the open loop gas burner and the closed loop gas burner, and a controller in operative communication with the flame rectification circuit and the spark module. The controller is configured to determine that the closed loop gas burner is performing the closed loop cooking operation, determine that no flame is present at the closed loop gas burner using the flame rectification circuit, and operate the spark module to energize the plurality of spark electrodes in response to determining that no flame is present during the closed loop cooking operation.

20 Claims, 3 Drawing Sheets

200

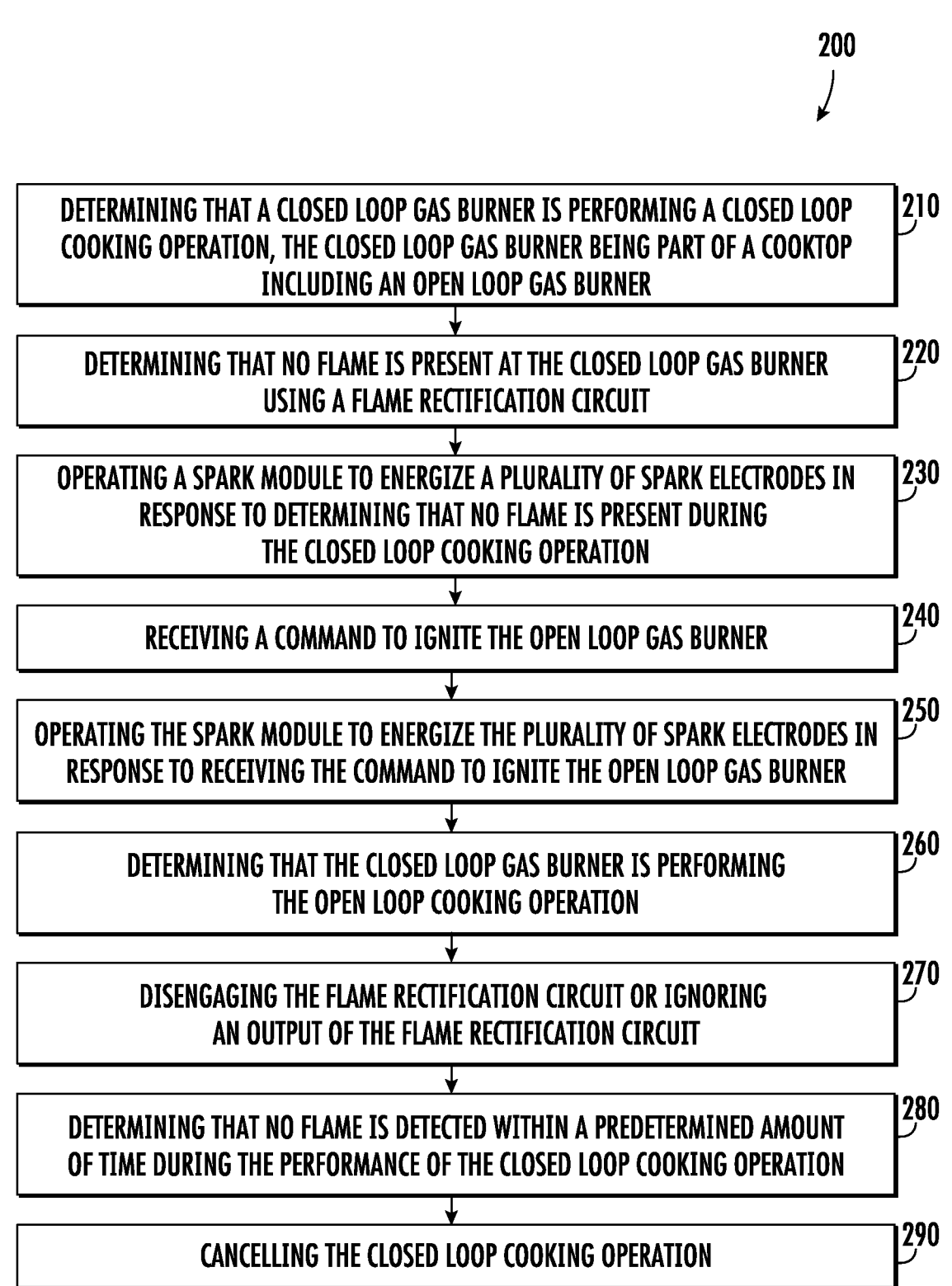

DETERMINING THAT A CLOSED LOOP GAS BURNER IS PERFORMING A CLOSED LOOP COOKING OPERATION, THE CLOSED LOOP GAS BURNER BEING PART OF A COOKTOP INCLUDING AN OPEN LOOP GAS BURNER                210

DETERMINING THAT NO FLAME IS PRESENT AT THE CLOSED LOOP GAS BURNER USING A FLAME RECTIFICATION CIRCUIT                220

OPERATING A SPARK MODULE TO ENERGIZE A PLURALITY OF SPARK ELECTRODES IN RESPONSE TO DETERMINING THAT NO FLAME IS PRESENT DURING THE CLOSED LOOP COOKING OPERATION                230

RECEIVING A COMMAND TO IGNITE THE OPEN LOOP GAS BURNER                240

OPERATING THE SPARK MODULE TO ENERGIZE THE PLURALITY OF SPARK ELECTRODES IN RESPONSE TO RECEIVING THE COMMAND TO IGNITE THE OPEN LOOP GAS BURNER                250

DETERMINING THAT THE CLOSED LOOP GAS BURNER IS PERFORMING THE OPEN LOOP COOKING OPERATION                260

DISENGAGING THE FLAME RECTIFICATION CIRCUIT OR IGNORING AN OUTPUT OF THE FLAME RECTIFICATION CIRCUIT                270

DETERMINING THAT NO FLAME IS DETECTED WITHIN A PREDETERMINED AMOUNT OF TIME DURING THE PERFORMANCE OF THE CLOSED LOOP COOKING OPERATION                280

CANCELLING THE CLOSED LOOP COOKING OPERATION                290

FIG. 4

FLAME RECTIFICATION CIRCUIT SYSTEM FOR A GAS COOKTOP

FIELD OF THE INVENTION

The present subject matter relates generally to gas cooktops, and more particularly, to flame rectification circuits for use in gas cooktops.

BACKGROUND OF THE INVENTION

Conventional gas cooktop appliances have one or more gas burners, e.g., positioned at a cooktop surface for use in heating or cooking an object, such as a cooking utensil and its contents. These gas burners typically combust a mixture of gaseous fuel and air to generate heat for cooking. These gas cooktops may include a grate or other support structure for receiving various cooking utensils, such as a griddle. For example, griddles may be positioned on the grate of the gas cooktop and may extend across multiple gas burners to provide a large, flat cooking surface.

Certain conventional gas cooktop appliances may use flame rectification circuits to detect the presence of a flame at the gas burners. These flame rectification circuits are typically integrated into the spark module and monitor the flame status of a burner any time the cooktop is powered on. Accordingly, when a flame is extinguished, the spark module may automatically provide ignition sparking until the rectification circuit detects that the flame has been restored. Notably, these flame rectification circuits and spark modules are typically provided for each burner of conventional gas cooktops.

However, conventional flame rectification circuits have a tendency for nuisance sparking due to false triggers. In this regard, because these circuits operate with microamp currents, it is common to detect a lack of flame despite flame being present. For example, drafts of air and ventilation sources may aggravate the problem. Another drawback is the cost of such systems, which require discrete channel monitoring of each burner on the cooktop. Because stove cooking is a manual, attended cooking function (unlike oven cooking), there is no requirement to have such flame rectification features for cooktops. For these reasons, appliance manufacturers often limit this feature to very high-end models.

Certain conventional gas cooktops use closed loop gas burner control features, e.g., to modify a flow or power to gas burner to regulate a cookware to a target temperature when operated in a closed loop mode. However, because the gas flow may be modified electronically as opposed to manually in these closed loop modes, a means to monitor the flame presence becomes appropriate.

Thus, it would be useful to avoid the costs associated with providing discrete flame monitoring and operation of each burner with flame rectification when only a single burner on a cooktop is equipped with an automatic control mode. It would also be of additional benefit if the system would only deploy flame sensing when specifically in the closed loop mode of operation and not during manual operation to reduce the likelihood of unnecessary nuisance sparking.

BRIEF DESCRIPTION OF THE INVENTION

Aspects and advantages of the invention will be set forth in part in the following description, or may be apparent from the description, or may be learned through practice of the invention.

In one exemplary embodiment, a cooktop defining a vertical direction, a lateral direction, and a transverse direction is provided. The cooktop includes an open loop gas burner configured to perform an open loop cooking operation and a closed loop gas burner configured to perform the open loop cooking operation or a closed loop cooking operation, a flame rectification circuit for detecting a flame at the closed loop gas burner, a spark module comprising a plurality of spark electrodes, at least one of the plurality of spark electrodes being operably coupled to each of the open loop gas burner and the closed loop gas burner, and a controller in operative communication with the flame rectification circuit and the spark module. The controller is configured to determine that the closed loop gas burner is performing the closed loop cooking operation, determine that no flame is present at the closed loop gas burner using the flame rectification circuit, and operate the spark module to energize the plurality of spark electrodes in response to determining that no flame is present during the closed loop cooking operation.

In another exemplary embodiment, a method of operating a cooktop is provided. The cooktop includes an open loop gas burner, a closed loop gas burner, a flame rectification circuit for detecting a flame at the closed loop gas burner, and a spark module comprising a plurality of spark electrodes. The method includes determining that the closed loop gas burner is performing the closed loop cooking operation, determining that no flame is present at the closed loop gas burner using the flame rectification circuit, and operating the spark module to energize the plurality of spark electrodes in response to determining that no flame is present during the closed loop cooking operation.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

FIG. 4 is a method of operating a cooktop appliance according to an exemplary embodiment of the present subject matter.

Figures 1, 2:
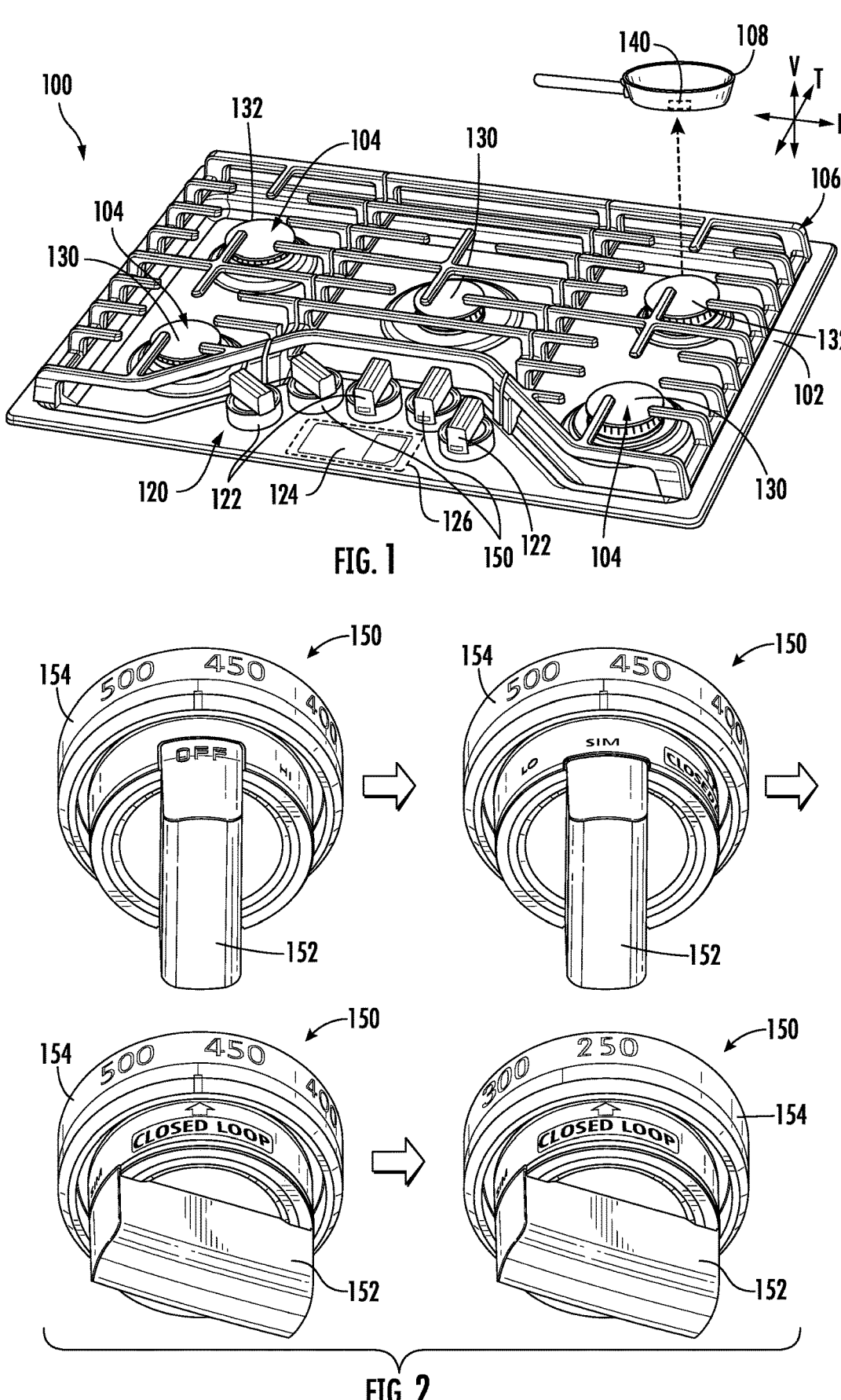
FIG. 1 provides a perspective view of a gas cooktop according to an example embodiment of the present subject matter.
FIG. 2 provides a schematic view of a control knob assembly for regulating the operation of the example gas cooktop of FIG. 1 according to example embodiments of the present subject matter.

Repeat use of reference characters in the present specification and drawings is intended to represent the same or analogous features or elements of the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (i.e., "A or B" is intended to mean "A or B or both"). In addition, here and throughout the specification and claims, range limitations may be combined and/or interchanged. Such ranges are identified and include all the sub-ranges contained therein unless context or language indicates otherwise. For example, all ranges disclosed herein are inclusive of the endpoints, and the endpoints are independently combinable with each other. The singular forms "a," "an," and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "generally," "about," "approximately," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin, i.e., including values within ten percent greater or less than the stated value. In this regard, for example, when used in the context of an angle or direction, such terms include within ten degrees greater or less than the stated angle or direction, e.g., "generally vertical" includes forming an angle of up to ten degrees in any direction, e.g., clockwise or counterclockwise, with the vertical direction V.

The word "exemplary" is used herein to mean "serving as an example, instance, or illustration." In addition, references to "an embodiment" or "one embodiment" does not necessarily refer to the same embodiment, although it may. Any implementation described herein as "exemplary" or "an embodiment" is not necessarily to be construed as preferred or advantageous over other implementations. Moreover, each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 illustrates an exemplary embodiment of a cooktop appliance, e.g., a gas cooktop 100, of the present disclosure. Gas cooktop 100 may be fitted integrally within a surface of a kitchen counter, may be configured as a slide-in cooktop unit, may be a part of a free-standing range cooking appliance, etc. Gas cooktop 100 may generally define a vertical direction V, a lateral direction L, and a transverse direction T, each of which is mutually perpendicular, such that an orthogonal coordinate system is generally defined. References to the horizontal direction or plane may refer generally to the plane defined by the lateral direction L and the transverse direction T.

Gas cooktop 100 includes a top panel 102 that includes one or more heating sources, such as heating elements 104 for use in, e.g., heating or cooking. Top panel 102, as used herein, refers to any upper surface of gas cooktop 100 over which utensils may be heated and therefore food cooked. In general, top panel 102 may be constructed of any suitably rigid and heat resistant material capable of supporting heating elements 104, cooking utensils, and/or other components of gas cooktop 100. By way of example, top panel 102 may be constructed of enameled steel, stainless steel, glass, ceramics, and combinations thereof.

According to the illustrated embodiment, the heating elements 104 of gas cooktop 100 are gas burners, so cooktop 100 may be referred to herein as "gas cooktop." In addition, gas cooktop 100 may include one or more grates 106 configured to support a cooking utensil (e.g., identified by reference numeral 108 in FIGS. 1 and 3), such as a pot, pan, etc. In general, grates 106 include a plurality of elongated members, e.g., formed of cast metal, such as cast iron. The cooking utensil 108 may be placed on the elongated members of each grate 106 such that the cooking utensil 108 rests on an upper surface of the elongated members during the cooking process. Heating elements 104 are positioned underneath the various grates 106 such that heating elements 104 provide thermal energy to cooking utensils above top panel 102 by combustion of fuel below the cooking utensils.

In some embodiments, the heating elements 104 of gas cooktop 100 may include a plurality of gas burners that are positioned on and/or within top panel 102 and have various sizes, as shown in FIG. 1, so as to provide for the receipt of cooking utensils (i.e., pots, pans, etc.) of various sizes and configurations and to provide different heat inputs for such cooking utensils. The top panel 102 may also include a recessed portion, e.g., which extends downward along the vertical direction V. The heating elements 104 may be positioned within the recessed portion. The recessed portion may collect spilled material, e.g., foodstuffs, during operation of the gas cooktop 100.

According to the illustrated example embodiment, a user interface panel or control panel 120 is located within convenient reach of a user of gas cooktop 100. For this example embodiment, control panel 120 includes control knobs 122 that are each associated with one of heating elements 104. Control knobs 122 allow the user to activate each heating element 104 and regulate the amount of heat input each heating element 104 provides to a cooking utensil 108 located thereon. Although gas cooktop 100 is illustrated as including control knobs 122 for controlling heating elements 104, it will be understood that control knobs 122 and the configuration of gas cooktop 100 shown in FIG. 1 is provided by way of example only. More specifically, control panel 120 may include various input components, such as one or more of a variety of touch-type controls, electrical, mechanical, or electro-mechanical input devices including rotary dials, push buttons, and touch pads.

According to the illustrated embodiment, control knobs 122 are located within control panel 120 of gas cooktop 100. However, it should be appreciated that this location is used only for the purpose of explanation, and that other locations and configurations of control panel 120 and control knobs 122 are possible and within the scope of the present subject matter. Indeed, according to alternative embodiments, control knobs 122 may instead be located directly on top panel 102 or elsewhere on gas cooktop 100, e.g., on a backsplash, front bezel, or any other suitable surface of gas cooktop 100. Control panel 120 may also be provided with one or more graphical display devices, such as a digital or analog display device designed to provide operational feedback to a user. For example, as best shown in FIGS. 1 and 2, gas cooktop 100 may further include an interactive display 124, e.g., such a touch screen display for facilitating user interaction, providing user notifications, etc.

Referring again to FIG. 1, operation of the gas cooktop 100 may be regulated by a controller 126 that is operably coupled to (i.e., in operative communication with) the user inputs (e.g., control knobs 122) and/or heating elements 104. In this regard, control panel 120, control knobs 122, interactive display 124, and other suitable inputs/outputs may be in communication with controller 126 such that controller 126 may regulate operation of gas cooktop 100. For example, signals generated by controller 126 may operate gas cooktop 100, including any or all system components, subsystems, or interconnected devices, in response to the position of control knobs 122 and other control commands. Control panel 120 and other components of gas cooktop 100 may be in communication with controller 126 via, for example, one or more signal lines or shared communication busses. In this manner, Input/Output ("I/O") signals may be routed between controller 126 and various operational components of gas cooktop 100.

As used herein, the terms "processing device," "computing device," "controller," or the like may generally refer to any suitable processing device, such as a general or special purpose microprocessor, a microcontroller, an integrated circuit, an application specific integrated circuit (ASIC), a digital signal processor (DSP), a field-programmable gate array (FPGA), a logic device, one or more central processing units (CPUs), a graphics processing units (GPUs), processing units performing other specialized calculations, semiconductor devices, etc. In addition, these "controllers" are not necessarily restricted to a single element but may include any suitable number, type, and configuration of processing devices integrated in any suitable manner to facilitate appliance operation. Alternatively, controller 126 may be constructed without using a microprocessor, e.g., using a combination of discrete analog and/or digital logic circuitry (such as switches, amplifiers, integrators, comparators, flip-flops, AND/OR gates, and the like) to perform control functionality instead of relying upon software.

Controller 126 may include, or be associated with, one or more memory elements or non-transitory computer-readable storage mediums, such as RAM, ROM, EEPROM, EPROM, flash memory devices, magnetic disks, or other suitable memory devices (including combinations thereof). These memory devices may be a separate component from the processor or may be included onboard within the processor. In addition, these memory devices can store information and/or data accessible by the one or more processors, including instructions that can be executed by the one or more processors. It should be appreciated that the instructions can be software written in any suitable programming language or can be implemented in hardware. Additionally, or alternatively, the instructions can be executed logically and/or virtually using separate threads on one or more processors.

For example, controller 126 may be operable to execute programming instructions or micro-control code associated with an operating cycle of gas cooktop 100. In this regard, the instructions may be software or any set of instructions that when executed by the processing device, cause the processing device to perform operations, such as running one or more software applications, displaying a user interface, receiving user input, processing user input, etc. Moreover, it should be noted that controller 126 as disclosed herein is capable of and may be operable to perform any methods, method steps, or portions of methods as disclosed herein. For example, in some embodiments, methods disclosed herein may be embodied in programming instructions stored in the memory and executed by controller 126.

The memory devices may also store data that can be retrieved, manipulated, created, or stored by the one or more processors or portions of controller 126. The data can include, for instance, data to facilitate performance of methods described herein. The data can be stored locally (e.g., on controller 126) in one or more databases and/or may be split up so that the data is stored in multiple locations. In addition, or alternatively, the one or more database(s) can be connected to controller 126 through any suitable network(s), such as through a high bandwidth local area network (LAN) or wide area network (WAN). In this regard, for example, controller 126 may further include a communication module or interface that may be used to communicate with one or more other component(s) of gas cooktop 100, controller 126, an external appliance controller, or any other suitable device, e.g., via any suitable communication lines or network(s) and using any suitable communication protocol. The communication interface can include any suitable components for interfacing with one or more network(s), including for example, transmitters, receivers, ports, controllers, antennas, or other suitable components.

According to an example embodiment of the present subject matter, heating elements 104 of gas cooktop 100 may include one or more open loop gas burners (e.g., identified herein generally by reference numeral 130) and one or more closed loop gas burners (e.g., identified herein generally by reference numeral 132). For example, according to the illustrated embodiment, the two front heating elements 104 and the middle heating element 104 may be open loop gas burners 130 and the two rear heating elements 104 may be closed loop gas burners 132. It should be appreciated that a different number, type, and configuration of heating elements 104 are possible and within the scope of the present subject matter.

As used herein, the terms "open loop gas burners" and "open loop cooking processes" are generally intended to refer to burners and processes, respectively, that operate in an open loop manner without operational feedback, e.g., from a temperature sensor. In this regard, in an open loop cooking process, the heat output from an open loop gas burner 130 may be manually regulated, e.g., by a position of a corresponding control knob or an input from a controller. By contrast, the terms "closed loop gas burners" and "closed loop cooking processes" are generally intended to refer to burners and processes, respectively, that operate in a closed loop manner based on operational feedback, e.g., such as temperature feedback from a temperature sensor. In this regard, in a closed loop cooking process, the heat output from a closed loop gas burner 132 may be regulated to drive a measured temperature of a cooking utensil 108 to a target cooking temperature, e.g., which may be input by a user.

According to example embodiments, the closed loop cooking process generally includes obtaining a cooking temperature of a cooking utensil (e.g., cooking utensil 108) using a temperature sensing assembly (e.g., temperature sensing assembly 140). The closed loop process further includes operating the closed loop gas burner 132 to drive the cooking temperature to a target cooking temperature. In this regard, this regulation may include implementing a closed loop feedback control algorithm based on the measured cooking temperature relative to the target cooking temperature. According to example embodiments, the closed loop feedback control algorithm may include the use of proportional (P), proportional-integral (PI), or proportional-integral-derivative (PID) control for feedback-based control implemented with, e.g., temperature feedback from one or more temperature sensors. It should be appreciated that other suitable methods of performing closed loop control are possible and within the scope of the present subject matter.

In the illustrated example embodiments, each gas burner 130, 132 includes a generally circular shape from which a flame may be emitted. As shown, each gas burner 130, 132 includes a plurality of fuel ports defined circumferentially in fluid communication with an internal passage of each respective gas burner 130, 132. In some embodiments, one or more of gas burners 130, 132 may be a multi-ring burner, e.g., including a first plurality of fuel ports defining a first ring of the gas burner and a second plurality of fuel ports defining a second ring of the gas burner. In such embodiments, a first fuel chamber in fluid communication with the first plurality of fuel ports may be separated from a second fuel chamber in fluid communication with the second plurality of fuel ports by a wall within the gas burner, and fuel may be selectively supplied to one or both of the fuel chambers within the gas burner. In some embodiments of a cooktop appliance, multiple burners of differing types may be provided in combination, e.g., one or more single-ring burners as well as one or more multi-ring burners. Moreover, other suitable burner configurations are also possible.

As noted above, closed loop gas burners 132 of gas cooktop 100 may be configured for closed loop cooking. For example, controller 126 may be operable to receive a set temperature (such as from a user input of the gas cooktop 100 or wirelessly from a remote device such as a smartphone) and compare the set temperature to temperature measurements from one or more temperature sensors, such as a temperature sensor associated with a cooking utensil 108. Controller 126 may be further programmed to automatically adjust each closed loop gas burner 132, such as a fuel flow rate to each burner, based on the comparison of the corresponding temperature measurement to the set temperature.

Accordingly, in order to facilitate a closed loop cooking process, gas cooktop 100 or associated cooking utensils may include a temperature sensing assembly 140 for monitoring the temperature of cooking utensil 108. For example, according to the illustrated embodiment, temperature sensing assembly 140 may generally include a temperature sensor that is configured to monitor a cooking temperature or a surface temperature of cooking utensil 108. According to the illustrated embodiment, temperature sensing assembly 140 may generally be embedded within the cooking utensil 108 and may be in wireless communication with controller 126 for providing temperature feedback to facilitate the closed loop cooking operation.

As used herein, "temperature sensor" or the equivalent is intended to refer to any suitable type of temperature measuring system or device positioned at any suitable location for measuring the desired temperature. Thus, for example, temperature sensing assembly 140 may each be any suitable type of temperature sensor, such as a thermistor, a thermocouple, a resistance temperature detector, a semiconductor-based integrated circuit temperature sensor, etc. In addition, temperature sensing assembly 140 may be positioned at any suitable location and may output a signal, such as a voltage, to a controller that is proportional to and/or indicative of the temperature being measured. Although exemplary positioning of temperature sensors is described herein, it should be appreciated that gas cooktop may include any other suitable number, type, and position of temperature sensors according to alternative embodiments.

Referring again to FIG. 1, gas cooktop 100 may include control knobs 122 for performing manual heating level control for open loop gas burners 130. Notably, control knobs 122 may be generally configured for manually regulating the heat output of open loop gas burners 130. This mode of operation may be referred to herein as the "manual," "normal," or "open loop" mode of operation. In addition, gas cooktop 100 may include control knob assemblies 150 for regulating the operation of closed loop gas burners 132. For example, referring now briefly to FIG. 2, control knob assembly 150 that may be used with a closed loop gas burner 132 will be described. In general, control knob assembly 150 may be used herein to place the gas cooktop 100 in a "closed loop" mode of operation, which will be described in more detail below.

According to the illustrated embodiment, each control knob assembly 150 may generally include a manual valve 152 for manually regulating a heating level of a respective closed loop gas burner 132. As illustrated, manual valve 152 may also be turned into a position where the "closed loop" mode is activated. When the closed loop mode is activated, and the presence of cooking utensil 108 is detected, temperature control for the cooking utensil 108 may be regulated by manipulating encoder 154. In this regard, encoder 154 may be rotated to set a particular cooking temperature, e.g., in degrees Fahrenheit, or any other suitable manner of setting the heating level (e.g., on a scale of 1 to 10, high-medium-low, etc.). For example, the first control knob on the left provides no heat because manual valve 152 is in the off position. The second control knob from the left has the manual valve turned to the simmer position, such that a simmering operation is performed. The third control knob from the left has the manual valve 152 turned to the closed loop position and the temperature set at 250° F., such that closed loop cooking on that respective heating zone is performed at 250° F. The last control knob has the manual valve 152 turned to the closed loop position and the temperature set at 460° F., such that closed loop cooking on that respective heating zone is performed at 460° F. Accordingly, it may be appreciated that closed loop gas burners 132 may performed both open loop and closed loop cooking operations.

Figure 3:
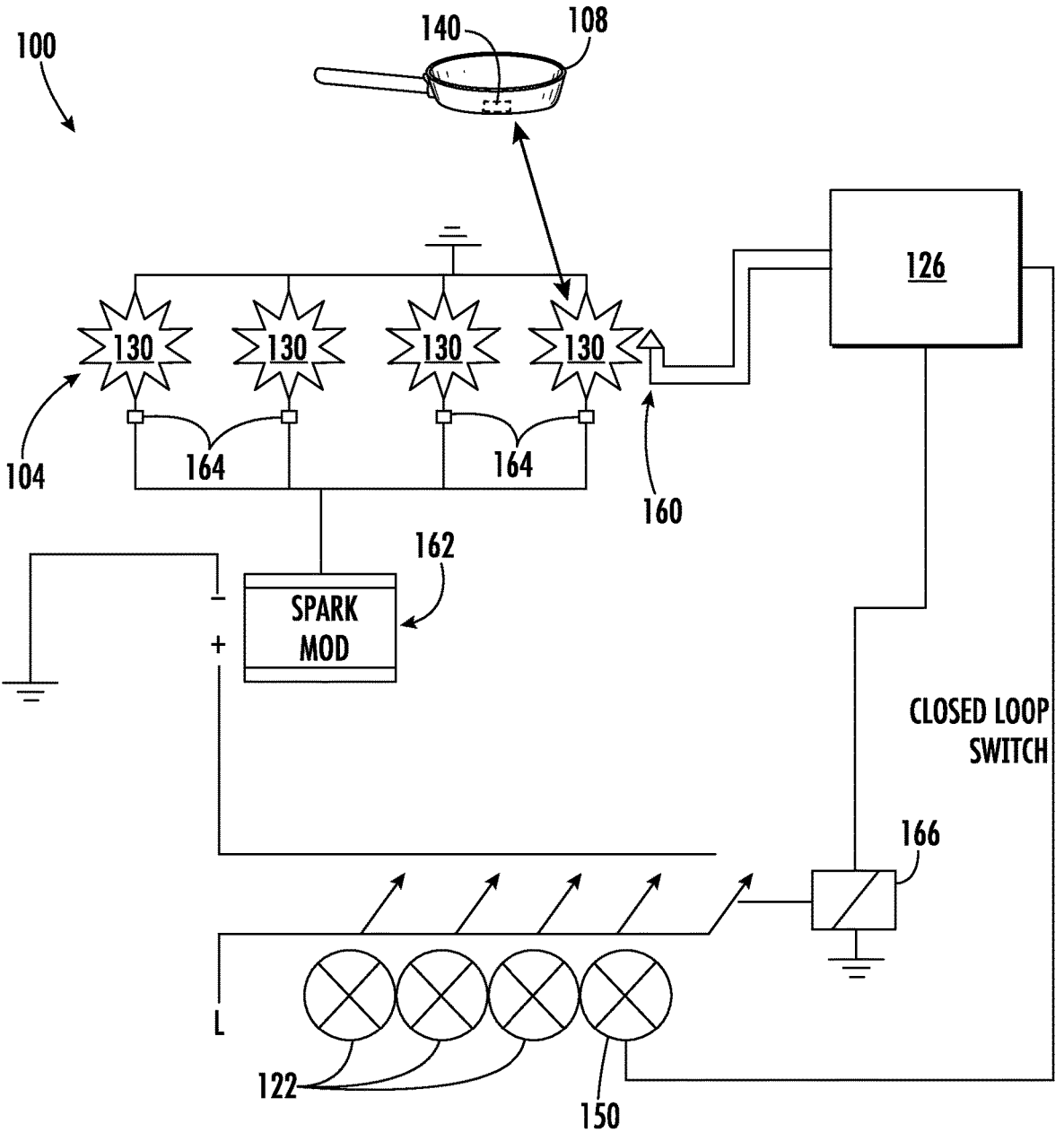
FIG. 3 is a schematic system view of a gas cooktop including a flame rectification circuit according to an example embodiment of the present subject matter.

Referring now specifically to FIG. 3, a schematic system view of a gas cooktop including a flame rectification circuit will be described. In general, a flame rectification circuit is configured for determining when a flame is present at a gas burner. In addition, a spark module may be generally configured for igniting one or more of the gas burners of a cooktop, e.g., by providing a spark to ignite a flow of fuel. These features will be described in more detail below according to an example embodiment. However, it should be appreciated that details regarding how these circuits and modules operate may be omitted herein for brevity.

According to an example embodiment, gas cooktop 100 may include a flame rectification circuit 160 for detecting a flame at closed loop gas burner 132. As would be understood to one of ordinary skill in the art, flame rectification is a process of converting alternating current (AC) to direct current (DC), where the flame enables current flow and the spark electrode to burner circuit acts as the rectifier. Alternatively, flame rectification circuit 160 may include a thermopile or any other suitable device configured for detecting a flame emanating from closed loop gas burner 132. For example, a thermopile is generally configured to generate a voltage when exposed to a temperature gradient, or a change in temperature across two points. Specifically, according to the illustrated embodiment, flame rectification circuit 160 may be operably coupled only to closed loop gas burners 132, e.g., to facilitate cost savings related to open loop gas burners 130.

According to an example embodiment, gas cooktop 100 may further include a spark module 162 comprising a plurality of spark electrodes 164, at least one of the plurality of spark electrodes 164 being operably coupled to each of the open loop gas burner 130 and the closed loop gas burner 132. As would be appreciated by one having ordinary skill in the art, spark electrodes 164 may include a high voltage rod tip spaced apart from a ground target by a spark gap that is placed proximate a gas outlet or within a flow of fuel. When a high voltage is applied to the high voltage rod tip, a spark is generated across the spark gap to facilitate ignition of the flow of gas. Other suitable spark electrode constructions are possible and within the scope of the present subject matter.

According to an example embodiment, spark module 162 may generally be coupled to each of the gas burners of the gas cooktop, e.g., including open loop gas burner 130 and closed loop gas burner 132. As illustrated in FIG. 3, connecting spark module 162 to line voltage (e.g., indicated by "L") causes spark module 162 to provide voltage across all spark electrodes 164, thereby igniting a flow of fuel at any of the gas burners. As illustrated, one manner of supplying such line voltage includes turning any of the control knobs 122 associated with open loop gas burners 130 to the igniting position or the "LITE" position.

In addition, flame rectification circuit 160 may include an electrical relay 166 that is in operative communication with controller 126. In this manner, controller 126 may monitor the position of control knob assembly 150. When control knob assembly 150 is in the "closed loop" position, controller 126 may use flame rectification circuit 160 to monitor for a flame at closed loop gas burner 132. If no flame is detected when manual valve 152 is in the "closed loop" position, controller 126 may close electrical relay 166, thereby supplying line voltage to spark module 162 and igniting all gas burner electrodes. Control knob assembly 150 may also supply line voltage to spark module 162 when manual valve 152 is in the "LITE" position.

Now that the construction and configuration of cooktop appliance 100 has been described according to exemplary embodiments of the present subject matter, an exemplary method 200 for operating cooktop appliance 100 will be described according to an exemplary embodiment of the present subject matter. Method 200 can be used to operate cooktop appliance 100, or may be used to operate any other suitable cooktop appliances. In this regard, for example, controller 126 may be configured for implementing some or all steps of method 200. Further, it should be appreciated that the exemplary method 200 is discussed herein only to describe exemplary aspects of the present subject matter and is not intended to be limiting.

Referring now to FIG. 4, method 200 includes, at step 210, determining that a closed loop gas burner is performing a closed loop cooking operation, the closed loop gas burner being part of a cooktop including one or more open loop gas burners. In this regard, continuing the example from above, gas cooktop 100 may include open loop gas burner 130 and closed loop gas burner 132. Step 210 may include determining that manual valve 152 of closed loop gas burner 132 is in the "closed loop" position.

Step 220 may include determining that no flame is present at the closed loop gas burner using a flame rectification circuit. In this regard, flame rectification circuit 160 may be used by controller 126 to determine whether a flame is present at closed loop gas burner 132. If closed loop gas burner 132 is operating in the "closed loop" mode and no flame is present, step 230 may include operating a spark module to energize a plurality of spark electrodes in response to determining that no flame is present during the closed loop cooking operation. Accordingly, step 230 may generally include reignition of closed loop gas burner 132 and or any of the open loop gas burners 130 that have a flow of gas passing therethrough. Notably, this ability to reignite closed loop gas burner 132 may be particularly advantageous because of the likelihood that a user is not monitoring automated cooking operations. In addition, this configuration may save costs associated with the use of flame rectification circuits at all gas burners as well as eliminate nuisance tripping of the spark module 162 due to flame detection at open loop gas burners 130.

Notably, it may also be desirable to ignite the open loop gas burners 130 and/or closed loop gas burners 132 when any of the control knobs are in the igniting position. Accordingly, step 240 may include receiving a command to ignite the open loop gas burner. For example, this command may come from manipulation of control knobs 122. Step 250 may include operating the spark module to energize the plurality of spark electrodes in response to receiving the command to ignite the open loop gas burner.

Similarly, step 260 may include determining that the closed loop gas burner is performing an open loop cooking operation. In this regard, step 260 may include determining that manual valve 152 of control knob assembly 150 is in the igniting position. Step 270 may include disengaging the flame rectification circuit or ignoring an output of the flame rectification circuit. In this manner, when closed loop gas burner 132 is operating in an "open loop" cooking operation, it may be desirable to ignore flame rectification circuit 160 and operate closed loop gas burner 132 in the same manner as open loop gas burners 130.

Notably, in the event that a closed loop cooking operation is being performed, it may be desirable to cancel the closed loop cooking operation if spark module 162 is unable to ignite closed loop gas burner 132. Accordingly, step 280 may include determining that no flame is detected within a predetermined amount of time (e.g., within 10 seconds, within 30 seconds, within 1 minute, etc.) during the performance of a closed loop cooking operation. In such an event, step 290 may include canceling the closed loop cooking operation 190 and/or providing a user notification that a fault condition is detected.

FIG. 4 depicts exemplary control methods having steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure. Moreover, although aspects of method 200 are explained using cooktop appliance 100 as an example, it should be appreciated that these methods may be applied to the operation of any suitable cooktop appliance.

As explained herein, aspects of the present subject matter are generally directed to a method to provide flame detection and remediation for one burner of a plurality of burners on a gas cooktop. The burner with an automatic control feature may be equipped with a sensor adjacent the burner flame. A control knob for the automatic burner may have a multi-channel switch, such that one switch sends line voltage to the spark module when knob is in "lite" position, and the second switch communicates to control when the burner is set to the automatic control position. The position of the knob corresponds to the automatic control setting when the manual gas valve is rotated to its lowest power setting furthest in rotation from a manual "lite" position. When a closed loop burner is in the automatic control mode, the range control may be configured to monitor the burner's flame sensor to determine the flame presence. If the knob is not in the closed loop control position, the circuit may not deploy flame rectification. If the current through the sensor is below a threshold (indicative of no flame), the range control may send line voltage to a spark module that sparks to all circuits until the sensor signal exceeds a threshold that indicates the flame is present. If no flame is indicated after a predetermined time has elapsed, then the control may elect to cancel the automatic control. Thus, with only the addition of a relay, a single sensor, and a knob position switch along with a range control, the ability to detect and restore flame to just one of a plurality of burners is realized in a cost-effective manner. In addition, nuisance sparking due to errors in flame detection may be minimized or eliminated altogether.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A cooktop defining a vertical direction, a lateral direction, and a transverse direction, the cooktop comprising:
   an open loop gas burner configured to perform an open loop cooking operation and a closed loop gas burner configured to perform the open loop cooking operation or a closed loop cooking operation;
   a flame rectification circuit for detecting a flame at the closed loop gas burner;
   a spark module comprising a plurality of spark electrodes, at least one of the plurality of spark electrodes being operably coupled to each of the open loop gas burner and the closed loop gas burner; and
   a controller in operative communication with the flame rectification circuit and the spark module, the controller being configured to:
      determine that the closed loop gas burner is performing the closed loop cooking operation;
      determine that no flame is present at the closed loop gas burner using the flame rectification circuit; and operate the spark module to energize the plurality of spark electrodes in response to determining that no flame is present during the closed loop cooking operation.

2. The cooktop of claim 1, further comprising:
   an electrical relay in operative communication with the flame rectification circuit, wherein operating the spark module comprises closing the electrical relay.

3. The cooktop of claim 1, wherein the controller is further configured to:
   receive a command to ignite the open loop gas burner; and
   operate the spark module to energize the plurality of spark electrodes.

4. The cooktop of claim 1, wherein the controller is further configured to:
   determine that the closed loop gas burner is performing the open loop cooking operation; and
   disengage the flame rectification circuit or ignore an output of the flame rectification circuit.

5. The cooktop of claim 1, wherein the controller is further configured to:
   determine that no flame is detected within a predetermined amount of time during the performance of the closed loop cooking operation; and
   cancel the closed loop cooking operation.

6. The cooktop of claim 1, wherein the open loop gas burner is one of a plurality of open loop gas burners, and wherein at least one of the plurality of spark electrodes are operably coupled to each of the plurality of open loop gas burners.

7. The cooktop of claim 1, wherein the closed loop gas burner is one of a plurality of closed loop gas burners, and wherein the flame rectification circuit is configured to detect flames at each respective burner of the plurality of closed loop gas burners.

8. The cooktop of claim 1, further comprising a temperature sensing assembly for monitoring a cooking temperature at the closed loop gas burner, wherein the closed loop cooking operation comprises:
   obtaining the cooking temperature using the temperature sensing assembly; and
   operating the closed loop gas burner to drive the cooking temperature to a target cooking temperature.

9. The cooktop of claim 8, wherein operating the closed loop gas burner to drive the cooking temperature to the target cooking temperature comprises:
   implementing a closed loop feedback control algorithm based on the cooking temperature and the target cooking temperature.

10. The cooktop of claim 9, wherein the closed loop feedback control algorithm comprises a proportional control algorithm, a proportional-integral control algorithm, or a proportional-integral-derivative control algorithm.

11. The cooktop of claim 1, further comprising a closed loop control knob operably coupled to the closed loop gas burner, the closed loop control knob comprising:
   a manual valve for manually regulating a heating level of the closed loop gas burner in the open loop cooking operation or placing the closed loop gas burner in the closed loop cooking operation; and
   an encoder for regulating a target cooking temperature of the closed loop cooking operation.

12. The cooktop of claim 11, further comprising:
   an electrical relay in operative communication with the flame rectification circuit, wherein the electrical relay is energized only if the manual valve places the closed loop gas burner in the closed loop cooking operation.

13. A method of operating a cooktop, the cooktop comprising an open loop gas burner, a closed loop gas burner, a flame rectification circuit for detecting a flame at the closed loop gas burner, and a spark module comprising a plurality of spark electrodes, the method comprising:

determining that the closed loop gas burner is performing the closed loop cooking operation;

determining that no flame is present at the closed loop gas burner using the flame rectification circuit; and operating the spark module to energize the plurality of spark electrodes in response to determining that no flame is present during the closed loop cooking operation.

14. The method of claim 13, further comprising:

an electrical relay in operative communication with the flame rectification circuit, wherein operating the spark module comprises closing the electrical relay.

15. The method of claim 14, wherein the electrical relay is energized only if the closed loop gas burner is in the closed loop cooking operation.

16. The method of claim 13, further comprising:

receiving a command to ignite the open loop gas burner; and operating the spark module to energize the plurality of spark electrodes.

17. The method of claim 13, further comprising:

determining that the closed loop gas burner is performing the open loop cooking operation; and disengaging the flame rectification circuit or ignore an output of the flame rectification circuit.

18. The method of claim 13, further comprising:

determining that no flame is detected within a predetermined amount of time during the performance of the closed loop cooking operation; and canceling the closed loop cooking operation.

19. The method of claim 13, wherein the cooktop further comprises a temperature sensing assembly for monitoring a cooking temperature at the closed loop gas burner, wherein the closed loop cooking operation comprises:

obtaining the cooking temperature using the temperature sensing assembly; and operating the closed loop gas burner to drive the cooking temperature to a target cooking temperature.

20. The method of claim 19, wherein operating the closed loop gas burner to drive the cooking temperature to the target cooking temperature comprises:

implementing a closed loop feedback control algorithm based on the cooking temperature and the target cooking temperature.

* * * * *